Sept. 16, 1958     W. E. JONES     2,851,857
MANUAL CONTROL SYSTEM FOR FUEL AND BLOWER PRESSURE
CONTROLLED DUAL FUEL PUMPS
Filed Dec. 21, 1953
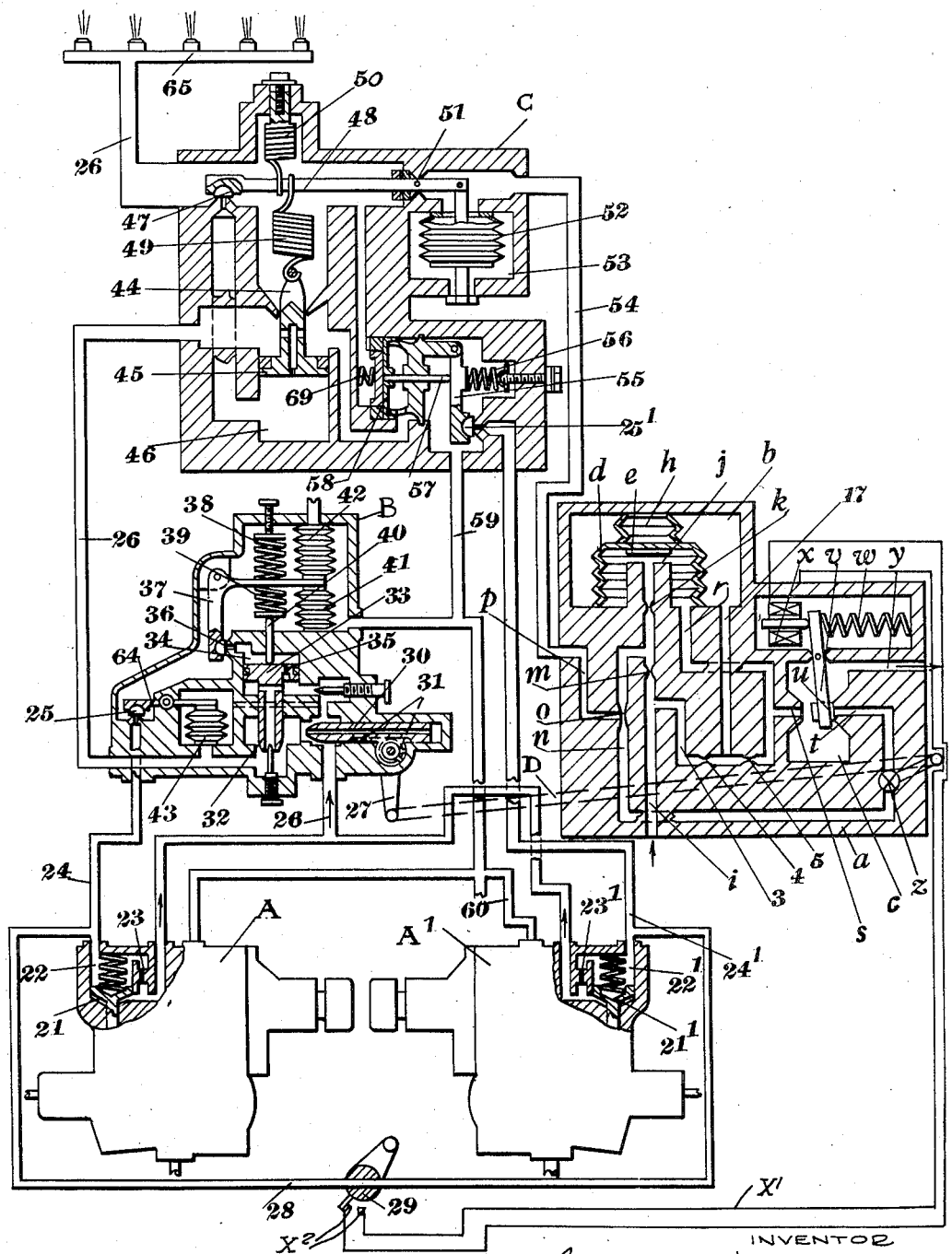
INVENTOR
W. E. JONES

2,851,857

MANUAL CONTROL SYSTEM FOR FUEL AND BLOWER PRESSURE CONTROLLED DUAL FUEL PUMPS

William E. Jones, Islington, Toronto, Canada, assignor to Joseph Lucas (Industries) Limited, Birmingham, England Application December 21, 1953, Serial No. 399,420

3 Claims. (Cl. 60—39.28)

This invention relates to liquid fuel supply systems for such prime movers as jet engines and gas turbines, of the kind in which the fuel is supplied at a variable rate to a burner in a combustion chamber by the joint action of a pair of pumps, the rate of supply of fuel to the burner being regulated by a pair of servo-operated means.

In particular the invention is concerned with a liquid fuel supply system of the kind aforesaid, in which the servo-mechanism of one of the fuel regulating means is under the control of one of a pair of automatic control means, and in which the servo-mechanism of the other fuel regulating means is under the control of the other of the said control means, and a normally-open isolating valve interconnecting both of the servo-mechanisms, together with any appropriate manually operable means for varying the action of the automatic control means, the arrangement being such that in the event of failure of either of the said servo-mechanisms or of the associated automatic control means, the supply of fuel can be maintained by the unaffected pump on closing the isolating valve.

One of the control means above mentioned includes an evacuated capsule which is subject to blower-air pressure and which is arranged to act on a valve for controlling a servo-mechanism acting on an associated throttle in the fuel-supply passage leading from the pumps to the burner.

It has been found desirable to be able to extend the lower limit of air pressure acting on the capsule to a pressure which is less than the ambient atmospheric pressure, and the object of the present invention is to provide a means for enabling this requirement to be met in a convenient manner.

A means for the said purpose in accordance with the invention includes a pair of passages through which air admitted at blower pressure can pass to the outer atmosphere, a valve whereby either passage can be closed and the other opened, a pair of restricted orifices in one of the passages, a venturi throat in the other passage, the entrance of this latter passage being situated between the restricted orifices, a branch passage leading from the venturi throat to the above mentioned blower-air actuated capsule, an automatic valve responsive to the blower pressure, or a predetermined fraction thereof, and to atmospheric pressure, for controlling the flow of air through the restricted orifices and a throttle in the exit part of the passage containing the venturi throat.

The accompanying drawing illustrates diagrammatically one embodiment of the invention.

Referring to the drawing, each of a pair of variable delivery fuel pumps A, $A^1$ of, for example, the swash plate type, has combined with it a liquid-operated servo-mechanism of known form for automatically varying the pump output under the control of factors associated with the working conditions of the system. The servo-mechanisms are of similar form, and may comprise spring-loaded pistons 21, $21^1$ slidable in cylinders 22, $22^1$ and adapted to control the angularly adjustable swash plates (not shown) of the pumps. Both ends of each of the cylinders 22, $22^1$ communicate with each other through a restricted orifice 23 or $23^1$, and vent pipes 24, $24^1$ leading from corresponding ends of the two cylinders are controlled by valves 25, $25^1$ (to be hereinafter described) which are each operable by one or more of the above mentioned factors. When either valve is closed the associated piston causes the corresponding pump to be adjusted to the condition of maximum output. With either valve open, the corresponding pump output is reduced.

In the example illustrated both pumps are arranged to supply fuel to a burner 65 through a common delivery pipe 26 in which are located two separate automatic means (indicated by B, C) for controlling the servo-mechanisms. The control means B is responsive to the rate of flow of fuel and also atmospheric pressure, and is adapted to control the vent valve 25 of the servo-mechanism associated with the pump A. The other control means C is responsive to the rate of flow of the fuel, and to the pressure of the air supplied by a blower to the prime mover, this means serving to control the vent valve $25^1$ of the servo-mechanism associated with the other pump $A^1$. A manually operable means 27 is provided for varying the action of the first mentioned control means B. Also a manually operable means z is provided for varying the action of the other control means C, and if desired, both of the manually operable means 27, z may be interconnected for joint actuation by a link D.

A pipe 28 interconnecting the servo-mechanisms of the two pumps contains a normally open isolating valve 29 which is manually operable.

Referring now to the particular form of control means indicated by B, this includes a slidable throttle 30 operable through a rack and pinion mechanism 31 by a lever forming the above mentioned manually operable means 27. Between the throttle 30 and the pipe 26 is arranged a second and automatically operable throttle 32 which is controlled by a fuel-operated servo-mechanism responsive to variations of atmospheric pressure. This servo-mechanism comprises a piston 33 slidable in a cylinder 34. Both ends of the cylinder are in communication with each other through a restricted orifice 35, and one end of the cylinder is provided with a vent which is controlled by a valve 36. This valve is carried by a lever 37 which is loaded by springs 38, 39, the spring 39 being supported on a thrust piece 40 acting on the piston 33. The lever 37 is also subject to the action of a pair of elastic capsules 41, 42, the capsule 41 being an evacuated capsule which is closed at both ends, and the capsule 42 being open at one end and subject to atmospheric air pressure. The difference of pressure between the inlet of the throttle 30 and the outlet of the throttle 32 is utilised by its action on a capsule 43 to actuate through a lever 64 the vent valve 25 which controls the servo-mechanism of the pump A.

The control means indicated by C includes a throttle 44 operable by a fuel-operated servo-mechanism comprising a piston 45 slidable in a cylinder 46. The upper end of this cylinder is open to the fuel pipe 26, and the other end is provided with a vent controlled by a valve 47. This valve is carried by a lever 48 which is loaded by a pair of springs 49, 50, the spring 49 being connected to the throttle 44. The lever 48 extends through a partition 51 and is connected at the end remote from the valve 47 to an elastic capsule 52 contained in a chamber 53 to which air from the blower is admitted by a pipe 54.

The control means C also includes a lever 55 carrying the vent valve $25^1$. At one side this lever is loaded by a spring 56, and at the other side it is acted on through a thrust piece 57 connected to an elastic diaphragm (or piston) 58 which is subject at its opposite sides to the difference of pressures at the inlet and outlet sides of the throttle 44, and to the pressure of a spring 69. The chamber containing the lever 55, and also the chamber containing the capsules 41, 42 of the control means B, are both connected by a pipe 59 to a fuel supply reservoir (not shown), which latter is connected to the pumps A, A¹ by pipes 60.

During normal working conditions, both of the servo-mechanisms which control the pumps A, A¹ are under the joint control of both of the above described automatic controlling means B, C, the isolating valve 29 being open. In the event of failure of either of the servo-mechanisms, or of the associated control means, due, for example, to the fracture of a pipe, the sticking of a vent valve, or other condition which would cause both pumps to assume the condition of minimum delivery, the pilot closes the isolating valve 29. The action of one of the pumps is thus rendered independent of the adverse conditions affecting the other pump, and to enable the effective pump to maintain an adequate supply of fuel, the pilot may modify the action of the automatic control means by actuation of the associated manually operable means 27, z.

The present invention is concerned with the control of blower air to the chamber 53 containing the capsule 52 of the control means C, and in acordance therewith there are provided in a body part $a$ two valve chambers $b$, $c$. In the chamber $b$ is contained an elastic capsule $d$ in which is provided a closure member $e$, and on the exterior of which is arranged a coaxial evacuated capsule $h$ of smaller diameter. In the body part $a$ is formed a passage $i$ (herein termed the first passage) to which air is admitted at blower pressure, and which leads to a seating $j$ with which co-operates the closure member $e$ in the capsule $d$. In this passage are contained two restricted orifices $k$, $m$ spaced at a convenient distance apart, and between the orifices is arranged the entrance to a second passage $n$ in which is provided a venturi throat $o$. At the throat is arranged the entrance to a branch passage $p$ which conveys air by way of the pipe 54 (or otherwise formed passage) to the chamber 53 containing the above mentioned capsule 52.

The passage $i$ containing the two restricted orifices $k$, $m$ is continued by another passage $r$ leading from the interior of the associated capsule $d$ to an outlet $s$ in the second chamber $c$. Also the second passage $n$ containing the venturi throat $o$ is provided with an outlet $t$ in the said second chamber $c$, the two outlets being coaxial. Between these outlets is arranged a valve $u$ carried by a lever $v$ which is loaded by a spring $w$ and is operable against the action of the spring by a solenoid $x$. Normally the said valve member closes the exit end $t$ of the second passage as shown. When the lever $v$ is moved by the solenoid to its other position it opens the said exit $t$ and closes the exit $s$ of the first passage. The second chamber is open to the outer atmosphere at $y$.

In the passage $n$ containing the venturi throat there is arranged a manually operable throttle forming the manually operable means $z$ above mentioned, this throttle being situated between the exit end of the throat $o$ and the second chamber $c$.

Further and preferably a branch passage 3 is provided in the position shown leading from the first passage $i$ to the exit end $s$ of the passage $r$, and in this branch passage are provided two restricted orifices 4, 5 from between which a further branch passage 17 extends to the chamber $b$ containing the capsules $d$, $h$.

The arrangement is such that normally, and when both fuel pumps are in action, the exit end $t$ of the second passage $n$ containing the venturi throat $o$ is closed by the valve $u$ in the chamber $c$ (as shown). When the ratio of the two air pressures acting on the capsule $d$ exceeds a predetermined amount the associated closure member $e$ closes and interrupts the flow of air through passages $i$, $r$. Full blower pressure then acts on the capsule 52. At other times, the pressure acting on the capsule 52 is a fraction of blower pressure, the amount of which being dependent on the areas of the restricted orifices $k$, $m$.

When one of the fuel pumps is put out of action, and it is required that the capsule 52 shall be subject to a relatively low pressure, movement of the isolating valve 29 is caused to close the circuit $x^1$ of the solenoid $x$ through the medium of switch $x^2$ and so move the valve $u$ in the chamber $c$ to its other position, so closing the exit $s$ of the first passage $i$ and opening the exit $t$ of the second passage $n$ containing the venturi throat $o$. The high air velocity through the throat then effects the required reduction of air pressure acting on the capsule 52, and the amount of reduction can be varied by regulation of the throttle $z$ in the passage $n$. As previously stated, during working conditions the isolating valve 29 is open, and both of the pumps A, A¹ are under the joint control of both of the automatic controlling means B, C, but in the event of failure of either of the servo-mechanisms, or of the associated control means, closure of the isolating valve renders the action of one of the pumps independent of the adverse conditions affecting the other pump. Thus, if the servo-mechanism of the pump A or the associated controlling means B fails, the pump A¹ serves to maintain the supply of fuel to the burner 65 under the control of the controlling means C. Whilst fuel from the pump A¹ passes through the controlling means C, this controlling means now has no effect on the quantity of fuel supplied to the burner 65, since this quantity is determined solely by the effect of the controlling means C on the vent valve 25¹ which controls the servo-mechanism of the pump A¹. Likewise, if the servo-mechanism of the pump A¹ or the associated controlling means C fails, the pump A serves to maintain the supply of fuel to the burner 65 under the control of the controlling means B. In this case fuel from the pump A passes not only through the controlling means B but also through the controlling means C. However, the controlling means C now has no effect on the quantity of fuel supplied to the burner, since this quantity is determined solely by the effect of the controlling means B on the vent valve 25 which controls the servo-mechanism of the pump A. In either case the pilot may vary the position of the throttle $z$ or 30 in order to modify the action of the effective controlling means A¹ or A, and thereby maintain an adequate supply of fuel to the burner 65.

Having thus described my invention what I claim as new and desire to secure by Letters Patent is:

1. A liquid fuel supply system for a prime mover adapted to be supplied with air by a blower, comprising in combination a pair of liquid fuel supply pumps, a pair of servo-mechanisms for determining the quantities of liquid fuel to be supplied to the prime mover by said pumps respectively, a normally open isolating valve interconnecting said servo-mechanisms, a pair of automatically operable control mechanisms connected to said servo-mechanisms so that the latter are controlled jointly by said control mechanisms when said valve is open, and respectively by said control mechanisms when said valve is closed, one of said control mechanisms including a capsule responsive to blower-air pressure and fuel control means connected to said capsule, a manually operable device associated with the other of said control mechanisms for varying the action thereof, and blower-air control means including a pair of passages through which blower air can pass to the outer atmosphere, and which have exits situated adjacent each other, a valve movable between said exits to close either and open the other, a pair of spaced restrictions in one of said passages, a venturi throat in the other of said passages, the entrance to the last mentioned passage being situated between said restrictions, a branch passage leading from said venturi throat to said capsule, an additional valve arranged to co-operate with the passage provided with said restrictions for controlling air flow through the latter in response to blower pressure, or a predetermined fraction thereof, and a manually operable throttle in the exit part of the passage containing said venturi throat.

2. A liquid fuel supply system according to claim 1, in which the valve controlling the two passages leading to the outer atmosphere is operable in response to movement of the isolating valve.

3. A liquid fuel supply system according to claim 2, in which the valve controlling the two passages leading to the outer atmosphere is provided with an actuating solenoid which is energizable in response to movement of the isolating valve.

References Cited in the file of this patent

UNITED STATES PATENTS

| | | |
|---|---|---|
| 2,503,048 | Ifield | Apr. 4, 1950 |
| 2,594,790 | Morley | Apr. 29, 1952 |
| 2,617,477 | Isreeli | Nov. 11, 1952 |
| 2,629,982 | Hooker | Mar. 3, 1953 |
| 2,668,415 | Lawrence | Feb. 9, 1954 |